United States Patent
Sobanski et al.

(10) Patent No.: US 12,037,945 B1
(45) Date of Patent: Jul. 16, 2024

(54) AIRCRAFT POWERPLANT WATER AND/OR HEAT ENERGY RECOVERY SYSTEM WITH WATER TREATMENT DEVICE

(71) Applicant: Raytheon Technologies Corporation, Farmington, CT (US)

(72) Inventors: Jon E. Sobanski, Glastonbury, CT (US); Jacob C. Snyder, East Haddam, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/213,654

(22) Filed: Jun. 23, 2023

(51) Int. Cl.
*F02C 7/141* (2006.01)
*F02C 3/30* (2006.01)
*F02C 7/22* (2006.01)

(52) U.S. Cl.
CPC ............... *F02C 7/141* (2013.01); *F02C 3/30* (2013.01); *F02C 7/22* (2013.01); *F05D 2220/323* (2013.01); *F05D 2260/609* (2013.01)

(58) Field of Classification Search
CPC .... F02C 7/141; F02C 3/30; F02C 7/22; F05D 2220/323; F05D 2260/609
See application file for complete search history.

(56) References Cited

U.S. PATENT DOCUMENTS

| | | | | |
|---|---|---|---|---|
| 5,271,215 A | * | 12/1993 | Guillet | ...................... F02C 7/08 60/39.55 |
| 5,953,900 A | * | 9/1999 | Bannister | .............. F01K 25/005 60/39.55 |
| 6,722,136 B2 | | 4/2004 | Daggett | |
| 8,153,057 B2 | * | 4/2012 | Hicks | ........................ C02F 1/68 210/757 |
| 10,215,412 B2 | * | 2/2019 | Huntington | ............... F23R 3/34 |
| 2005/0252214 A1 | * | 11/2005 | Goldmeer | .............. B63H 21/17 60/698 |
| 2007/0227154 A1 | * | 10/2007 | Pelini | ...................... F02C 3/305 60/39.182 |
| 2008/0073288 A1 | * | 3/2008 | Fan | ...................... C02F 1/4691 204/554 |
| 2008/0163618 A1 | * | 7/2008 | Paul | ......................... F03D 9/17 60/407 |

(Continued)

FOREIGN PATENT DOCUMENTS

| | | |
|---|---|---|
| EP | 634563 A | 1/1995 |
| GB | 626208 A | 7/1949 |

*Primary Examiner* — Jesse S Bogue
(74) *Attorney, Agent, or Firm* — Getz Balich LLC

(57) ABSTRACT

A powerplant for an aircraft includes a turbine engine core, a recovery system and a flowpath. The turbine engine core includes a compressor section, a combustor section and a turbine section. The recovery system includes a condenser and a flow circuit. The flow circuit includes a separator and a treatment device. The recovery system is configured to condense water flowing within the flowpath from a gaseous phase to a liquid phase using the condenser. The recovery system is configured to direct the water in the liquid phase from the flowpath into the flow circuit using the separator. The recovery system is configured to treat a quantity of the water within the flow circuit using the treatment device to provide treated water. The recovery system is configured to provide a quantity of the treated water to the turbine engine core.

13 Claims, 4 Drawing Sheets

(56) References Cited

U.S. PATENT DOCUMENTS

| | | | |
|---|---|---|---|
| 2010/0300218 A1* | 12/2010 | Fruzzetti | C23G 1/26 73/863.11 |
| 2010/0304230 A1* | 12/2010 | Lesieur | H01M 8/0675 429/410 |
| 2010/0314878 A1* | 12/2010 | DeWitt | F02C 3/30 290/55 |
| 2021/0207500 A1* | 7/2021 | Klingels | F01K 23/10 |
| 2023/0150678 A1* | 5/2023 | Klingels | B01D 5/0081 244/55 |

* cited by examiner

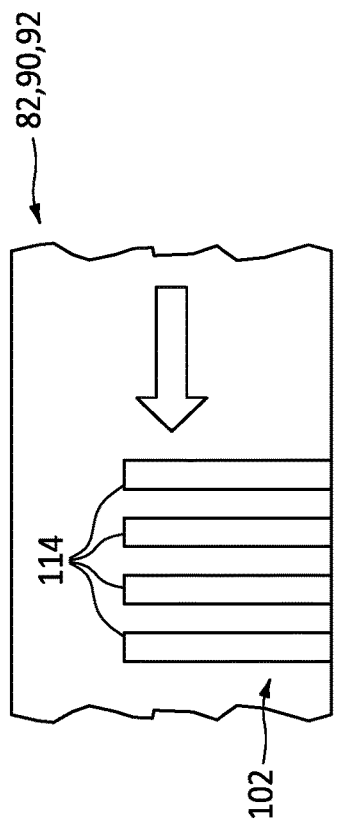
FIG. 3
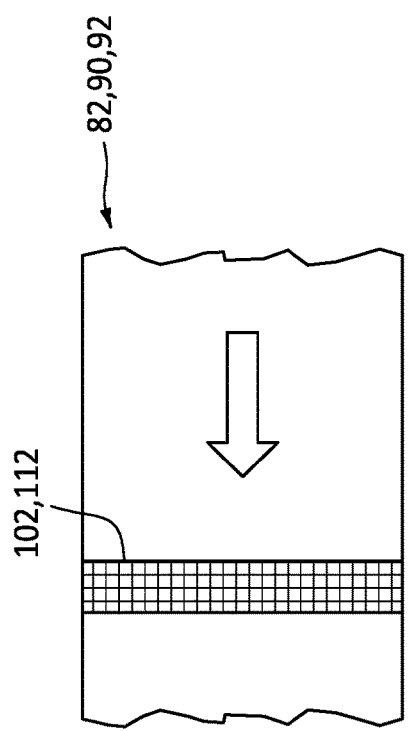
FIG. 4
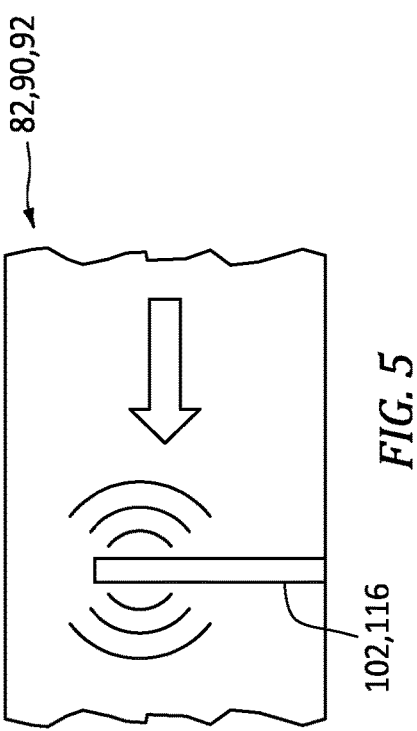
FIG. 5
FIG. 6

AIRCRAFT POWERPLANT WATER AND/OR HEAT ENERGY RECOVERY SYSTEM WITH WATER TREATMENT DEVICE

GOVERNMENT LICENSE RIGHTS

This invention was made with Government support under Contract DE-AR0001561 awarded by the United States Department of Energy, Office of ARPA-E. The Government has certain rights in this invention.

BACKGROUND OF THE DISCLOSURE

1. Technical Field

This disclosure relates generally to a powerplant and, more particularly, to recovering water and/or heat energy from combustion products of the powerplant.

2. Background Information

As government emissions standards tighten, interest in alternative fuels for turbine engines continues to grow. There is interest, for example, in fueling a turbine engine with hydrogen fuel rather than a traditional hydrocarbon fuel such as kerosine to reduce greenhouse emissions. Combustion products produced by combusting hydrogen fuel include water vapor, and exhausted combustion products carry waste heat energy. Various systems and methods are known in the art for recovering the water vapor and/or the heat energy. While these known systems and methods have various advantages, there is still room in the art for improvement.

SUMMARY OF THE DISCLOSURE

According to an aspect of the present disclosure, a powerplant is provided for an aircraft. This aircraft powerplant includes a turbine engine core, a recovery system and a flowpath. The turbine engine core includes a compressor section, a combustor section and a turbine section. The recovery system includes a condenser and a flow circuit. The flow circuit includes a separator and a treatment device. The flowpath extends sequentially through the compressor section, the combustor section, the turbine section and the condenser from an inlet into the flowpath to an exhaust from the flowpath. The recovery system is configured to condense water flowing within the flowpath from a gaseous phase to a liquid phase using the condenser. The recovery system is configured to direct the water in the liquid phase from the flowpath into the flow circuit using the separator. The recovery system is configured to treat a quantity of the water within the flow circuit using the treatment device to provide treated water. The recovery system is configured to provide a quantity of the treated water to the turbine engine core.

According to another aspect of the present disclosure, another powerplant is provided for an aircraft. This aircraft powerplant includes a propulsor rotor, a turbine engine core, a recovery system, a core flowpath and a bypass flowpath. The turbine engine core is configured to drive rotation of the propulsor rotor. The turbine engine core includes a compressor section, a combustor section and a turbine section. The recovery system includes a condenser and a flow circuit. The flow circuit includes a separator and a treatment device. The core flowpath extends through the compressor section, the combustor section, the turbine section and the condenser from an inlet into the flowpath to an exhaust from the flowpath. The bypass flowpath bypasses the turbine engine core and extends through the condenser. The recovery system is configured to condense water flowing within the flowpath from a gaseous phase to a liquid phase using the condenser. The recovery system is configured to direct the water in the liquid phase from the flowpath into the flow circuit using the separator. The recovery system is configured to treat a quantity of the water within the flow circuit using the treatment device to provide treated water.

According to still another aspect of the present disclosure, another powerplant is provided for an aircraft. This aircraft powerplant includes a propulsor rotor, a turbine engine core, a recovery system, a core flowpath and a fuel system. The turbine engine core is configured to drive rotation of the propulsor rotor. The turbine engine core includes a compressor section, a combustor section and a turbine section. The recovery system includes a condenser and a flow circuit. The flow circuit includes a separator and a treatment device. The core flowpath extends through the compressor section, the combustor section, the turbine section and the condenser from an inlet into the flowpath to an exhaust from the flowpath. The fuel system includes a fuel circuit extending through the condenser. The fuel system is configured to deliver fuel through the fuel circuit to the combustor section. The recovery system is configured to condense water flowing within the flowpath from a gaseous phase to a liquid phase using the condenser. The recovery system is configured to direct the water in the liquid phase from the flowpath into the flow circuit using the separator. The recovery system is configured to treat a quantity of the water within the flow circuit using the treatment device to provide treated water.

The recovery system may also be configured to provide a quantity of the treated water to the turbine engine core in the liquid phase and/or in the gaseous phase.

The fuel may be or otherwise include non-hydrocarbon fuel.

The fuel may be or otherwise include hydrocarbon fuel.

The treatment device may be configured as or otherwise include a filter. The recovery system may be configured to direct the quantity of the water within the flow circuit through the filter to provide the treated water.

The quantity of the water directed through the filter may be in the liquid phase.

The flow circuit may also include an evaporator. The recovery system may be configured to evaporate the quantity of the water from the liquid phase to the gaseous phase. The quantity of the water directed through the filter may be in the gaseous phase.

The flowpath may extend through the evaporator. The evaporator may be arranged fluidly between the turbine section and the exhaust.

The treatment device may be configured as or otherwise include an anode. The recovery system may be configured to expose the quantity of the water within the flow circuit to the anode to promote a redox reaction between the anode and one or more contaminants within the quantity of the water to provide the treated water.

The treatment device may be configured as or otherwise include an ultrasonic device. The ultrasonic device may be configured to direct ultrasonic sound waves into the quantity of the water within the flow circuit to provide the treated water.

The recovery system may be configured to direct a chemical into the quantity of the water within the flow circuit using the treatment device to provide the treated water.

The chemical may be or otherwise include a corrosion inhibitor.

The quantity of the treated water provided to the turbine engine core may be in the liquid phase.

The flow circuit may also include an evaporator. The recovery system may be configured to evaporate the quantity of the treated water from the liquid phase to the gaseous phase. The quantity of the treated water provided to the turbine engine core may be in the gaseous phase.

The flowpath may extend through the evaporator. The evaporator may be arranged fluidly between the turbine section and the exhaust.

The recovery system may also be configured to provide a second quantity of the treated water to the turbine engine core in the liquid phase.

The flow circuit may also include a water reservoir. The treatment device may be fluidly coupled with and between the separator and the water reservoir.

The flow circuit may also include a water reservoir fluidly coupled with the separator. The treatment device may be disposed within the water reservoir.

The flow circuit may also include a water reservoir. The water reservoir may be fluidly coupled with and between the separator and the treatment device.

The flow circuit may also include an evaporator arranged fluidly between the turbine section and the exhaust. The flowpath may extend through the evaporator. The treatment device may be fluidly coupled with and between the separator and the evaporator.

The flow circuit may also include an evaporator arranged fluidly between the turbine section and the exhaust. The flowpath may extend through the evaporator. The evaporator may be fluidly coupled with and between the separator and the treatment device.

The powerplant may also include a mechanical load. The turbine engine core may be configured to power the mechanical load.

The mechanical load may be configured as or otherwise include a propulsor rotor. The turbine engine core may also include a power turbine section configured to drive rotation of the propulsor rotor.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 3 is a schematic illustration of a portion of the recovery system with a water filter treatment device.

FIG. 4 is a schematic illustration of a portion of the recovery system with multiple anode treatment devices.

FIG. 5 is a schematic illustration of a portion of the recovery system with an ultrasonic treatment device.

FIG. 6 is a schematic illustration of a portion of the recovery system with a chemical injection treatment device.

DETAILED DESCRIPTION

Figure 1:
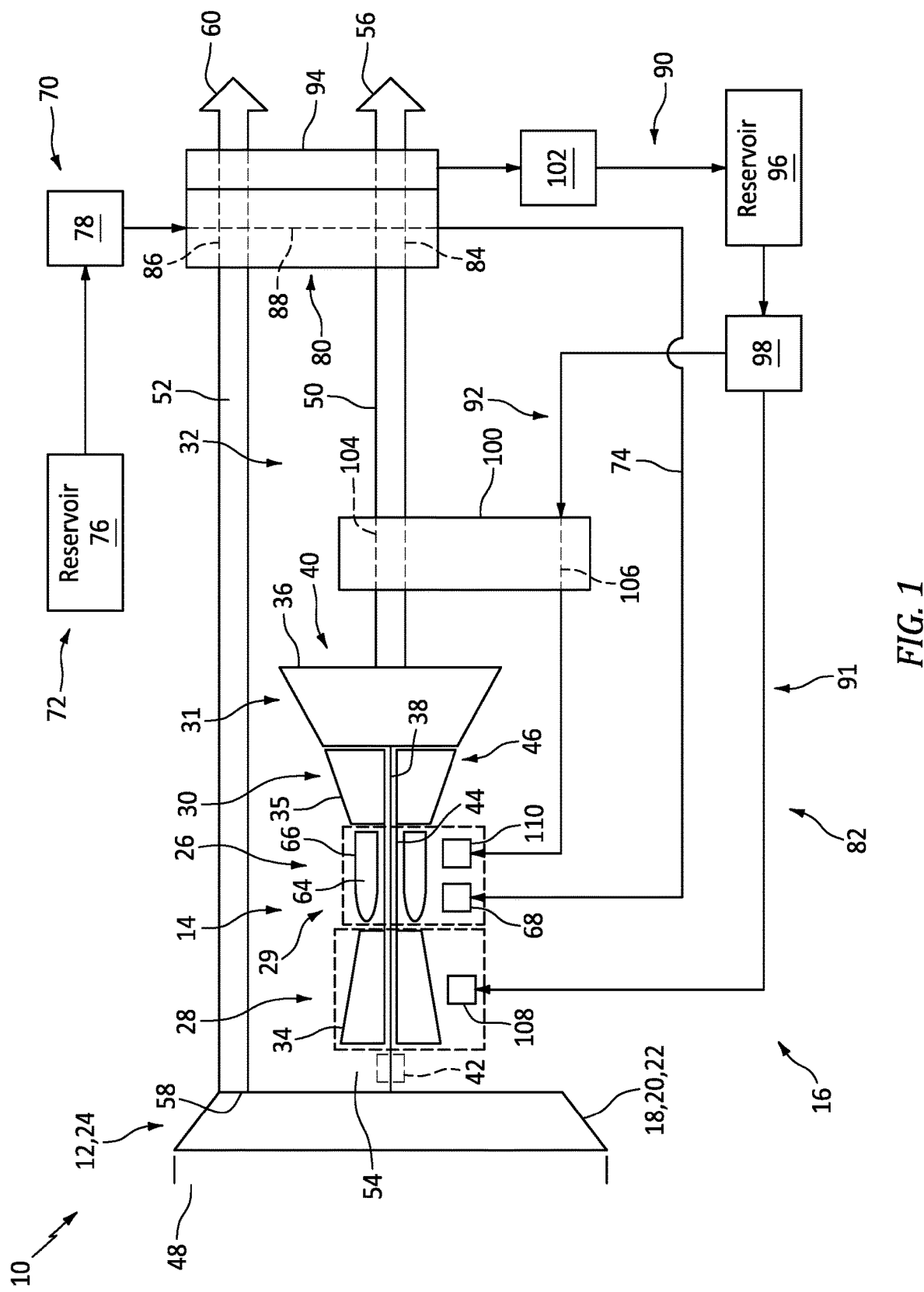
FIG. 1 is a partial schematic illustration of a powerplant with a water and energy recovery system.

FIG. 1 illustrates a powerplant 10 for an aircraft. The aircraft may be an airplane, a helicopter, a drone (e.g., an unmanned aerial vehicle (UAV)) or any other manned or unmanned aerial vehicle or system. The powerplant 10 may be configured as, or otherwise included as part of, a propulsion system for the aircraft. The powerplant 10 may also or alternatively be configured as, or otherwise included as part of, an electrical power system for the aircraft. The powerplant 10 of FIG. 1 includes a mechanical load 12 and a powerplant engine 14 (e.g., a gas turbine engine) configured to power the mechanical load 12. This powerplant 10 also includes a water and heat energy recovery system 16.

The mechanical load 12 of FIG. 1 includes at least one driven rotor 18. This driven rotor 18 may be configured as a bladed propulsor rotor 20 for the aircraft propulsion system. The propulsor rotor 20 may be a ducted propulsor rotor or an open propulsor rotor; e.g., an un-ducted propulsor rotor. An example of the ducted propulsor rotor is a fan rotor 22 for a ducted propulsion system; e.g., a turbofan propulsion system. Examples of the open propulsor rotor include a propeller rotor for a propeller propulsion system (e.g., a turboprop propulsion system), a rotorcraft rotor (e.g., a main helicopter rotor) for a rotorcraft propulsion system (e.g., a turboshaft propulsion system), a pusher fan rotor for a pusher fan propulsion system, and a propfan rotor for a propfan propulsion system. Alternatively, the driven rotor 18 may be configured as a generator rotor of an electric power generator for the aircraft electrical power system; e.g., an auxiliary power unit (APU) system. However, for ease of description, the mechanical load 12 is described below as a fan section 24 of the powerplant 10 and the driven rotor 18 is described below as the fan rotor 22.

The powerplant engine 14 of FIG. 1 includes a turbine engine core 26; e.g., a gas generator. This engine core 26 includes a core compressor section 28, a core combustor section 29 and a core turbine section 30. The powerplant engine 14 of FIG. 1 also includes a power turbine (PT) section 31 and an exhaust section 32. Here, the core turbine section 30 is configured as a high pressure turbine (HPT) section of the powerplant engine 14, and the PT section 31 is configured as a low pressure turbine (LPT) section of the powerplant engine 14.

Each of the powerplant sections 28, 30 and 31 includes a respective bladed rotor 34-36. Each of the rotors 34-36 includes a plurality of rotor blades arranged circumferentially around and connected to one or more respective rotor disks and/or hubs. The rotor blades, for example, may be formed integral with or mechanically fastened, welded, brazed and/or otherwise attached to the respective rotor disk(s) and/or hub(s).

The fan rotor 22 of FIG. 1 is connected to and driven by the PT rotor 36 through a low speed shaft 38. At least (or only) the fan rotor 22, the low speed shaft 38 and the PT rotor 36 may form a low speed rotating assembly 40; e.g., a low speed spool. This low speed rotating assembly 40 may be configured as a direct drive rotating assembly where the fan rotor 22 and the PT rotor 36 rotate at a common speed. The low speed rotating assembly 40, however, may alternatively be configured as a geared rotating structure with a geartrain 42 (e.g., an epicyclic gearbox) coupled between the fan rotor 22 and the PT rotor 36. With such an arrangement, the fan rotor 22 rotates at a different (e.g., slower) speed than the PT rotor 36. The compressor rotor 34 of FIG. 1 is connected to and driven by the HPT rotor 35 through a high speed shaft 44. At least (or only) the compressor rotor 34, the high speed shaft 44 and the HPT rotor 35 may form a high speed rotating assembly 46; e.g., a high speed spool. Each of the powerplant rotating assemblies 40, 46 is supported by a plurality of bearings and rotates about a respective rotational axis, which rotational axes may be coaxial or offset (e.g., angled and/or spaced) from one another.

During operation of the powerplant 10 of FIG. 1, air enters the powerplant 10 through an airflow inlet 48 into the powerplant 10. This air is directed through the fan section 24 and into a core flowpath 50 (e.g., annular core flowpath) and a bypass flowpath 52 (e.g., annular bypass flowpath). The core flowpath 50 extends sequentially through the compressor section 28, the combustor section 29, the turbine section 30, the PT section 31 and the exhaust section 32 from an airflow inlet 54 into the core flowpath 50 to a combustion products exhaust 56 from the core flowpath 50. The air within the core flowpath 50 may be referred to as "core air". The bypass flowpath 52 extends through a bypass duct and bypasses (e.g., is radially outboard of and extends along) the powerplant engine 14 and its engine core 26, from an airflow inlet 58 into the bypass flowpath 52 to an airflow exhaust 60 from the bypass flowpath 52. The air within the bypass flowpath 52 may be referred to as "bypass air". Briefly, the core inlet 54 and the bypass inlet 58 may each be fluidly coupled with, adjacent and downstream of the fan section 24. The airflow inlet 48, the core exhaust 56 and the bypass exhaust 60 may each be fluidly coupled (e.g., independently, directly) with an environment external to the powerplant 10; e.g., an external environment outside of the aircraft.

The core air is compressed by the compressor rotor 34 and directed into a combustion chamber 64 (e.g., an annular combustion chamber) of a combustor 66 (e.g., an annular combustor) in the combustor section 29. Fuel is injected into the combustion chamber 64 by one or more fuel injectors 68 (see also FIG. 2) and mixed with the compressed core air to provide a fuel-air mixture. This fuel-air mixture is ignited and combustion products thereof flow through and sequentially cause the HPT rotor 35 and the PT rotor 36 to rotate. The rotation of the HPT rotor 35 drives rotation of the compressor rotor 34 and, thus, compression of the air received from the core inlet 54. The rotation of the PT rotor 36 drives rotation of the fan rotor 22, which propels the bypass air through and out of the bypass flowpath 52. The propulsion of the bypass air may account for a majority of thrust generated by the aircraft propulsion system. Of course, where the mechanical load 12 also or alternatively includes the generator rotor, the rotation of the PT rotor 36 may drive the electric power generator to generate electricity.

Figure 2:
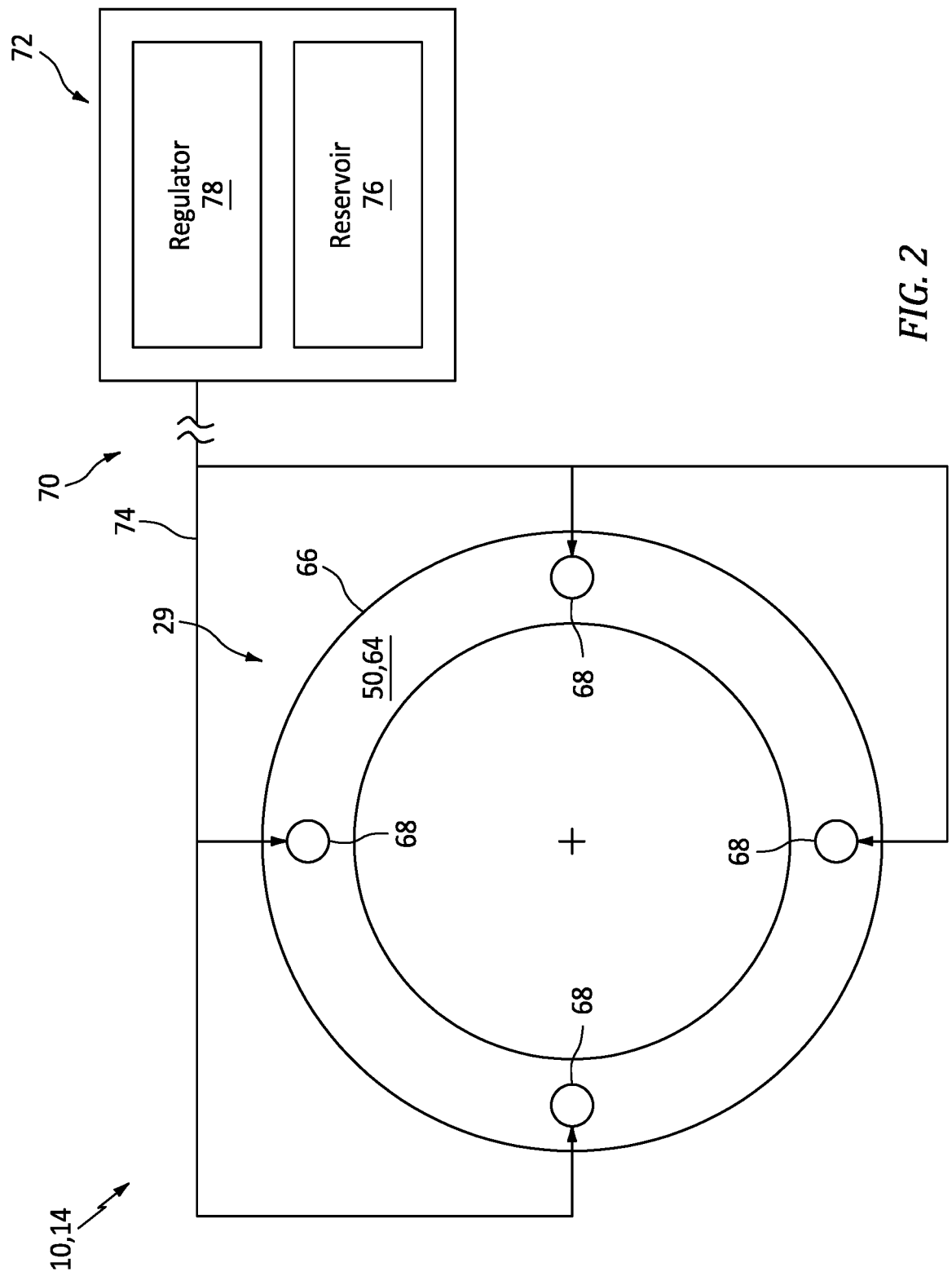
FIG. 2 is a partial schematic illustration of a fuel system for the powerplant.

Referring to FIG. 2, the powerplant 10 includes a fuel system 70 for delivering the fuel to the combustor section 29 and its combustor 66. This fuel system 70 includes the one or more fuel injectors 68, a fuel source 72 and a fuel circuit 74. The fuel source 72 of FIG. 2 includes a fuel reservoir 76 and/or a fuel flow regulator 78; e.g., a valve and/or a pump. The fuel reservoir 76 is configured to store the fuel before, during and/or after turbine engine operation. The fuel reservoir 76, for example, may be configured as or otherwise include a tank, a cylinder, a pressure vessel, a bladder or any other type of fuel storage container. The fuel flow regulator 78 is configured to direct and/or meter a flow of the fuel from the fuel reservoir 76 to the fuel injectors 68. The fuel injectors 68 may be arranged circumferentially about the rotational axis in an array. Each fuel injector 68 is configured to direct the fuel received from the fuel source 72 into the combustion chamber 64 for mixing with the compressed core air to provide the fuel-air mixture.

The powerplant engine 14 of FIG. 1 may be configured as a non-hydrocarbon turbine engine/a hydrocarbon free turbine engine. The turbine engine, for example, may be configured as a hydrogen fueled turbine engine. The fuel injected into the combustion chamber 64 by the fuel injectors 68, for example, may be hydrogen ($H_2$) fuel; e.g., $H_2$ gas. The present disclosure, however, is not limited to hydrogen fueled turbine engines nor to non-hydrocarbon turbine engines. The powerplant engine 14, for example, may also or alternatively be fueled by another non-hydrocarbon fuel such as, but not limited to, ammonia ($NH_3$). The powerplant engine 14 may still also or alternatively be fueled using any other fuel, including hydrocarbon fuels (e.g., kerosene, jet fuel, sustainable aviation fuel (SAF), etc.), which produces combustion products that include water ($H_2O$) vapor.

The recovery system 16 of FIG. 1 is configured to recover at least some of the water produced by the combustion of the fuel-air mixture within the combustion chamber 64. The recovery system 16 is also configured to direct at least some of the recovered water back to the powerplant engine 14 for use in its engine core 26; e.g., in the compressor section 28 and/or in the combustor section 29. The recovery system 16 of FIG. 1, for example, includes a condenser 80 and a water flow circuit 82.

The condenser 80 of FIG. 1 includes an internal combustion products passage 84, an internal bypass air passage 86 and an internal fuel passage 88, where each of these condenser passages 84, 86, 88 is fluidly discrete from one another. The combustion products passage 84 forms a portion of the core flowpath 50 which extends longitudinally through the condenser 80. This portion of the core flowpath 50 is arranged between the PT rotor 36 and the core exhaust 56. The condenser 80 of FIG. 1, for example, is arranged within the exhaust section 32. The bypass air passage 86 forms a portion of the bypass flowpath 52 which extends longitudinally through the condenser 80. The fuel passage 88 forms a portion of the fuel circuit 74 longitudinally through the condenser 80. This portion of the fuel circuit 74 may be arranged between the fuel source 72 and one or more or all of the fuel injectors 68.

The condenser 80 of FIG. 1 is schematically shown as a single pass, parallel flow heat exchanger between the combustion products passage 84 and the bypass air passage 86, and the condenser 80 is schematically shown as a single pass, crossflow heat exchanger between the combustion products passage 84 and the fuel passage 88. The condenser 80 of the present disclosure, however, is not limited to such an exemplary arrangement. The condenser 80, for example, may alternatively be configured as a crossflow heat exchanger or a counterflow heat exchanger between the combustion products passage 84 and the bypass air passage 86. The condenser 80 may also or alternatively be configured as a parallel flow heat exchanger or a counterflow heat exchanger between the combustion products passage 84 and the fuel passage 88. Any one or more of the condenser passages 84, 86, 88 may make two or more passes within the condenser 80. Moreover, while the condenser 80 is shown with the three condenser passages 84, 86 and 88, it is contemplated the bypass air passage 86 or the fuel passage 88 may be omitted in other embodiments and/or incorporated into another condenser arranged along the core flowpath 50.

The flow circuit 82 of FIG. 1 is configured with one or more circuit paths 90-92; e.g., circuit legs. This flow circuit 82 includes a water separator 94, a water reservoir 96, a water flow regulator 98 and an evaporator 100. The flow circuit 82 of FIG. 1 also includes a water treatment device 102.

The water separator 94 is arranged with the condenser 80 along the core flowpath 50. The water separator 94, for example, may be configured as or otherwise include a gutter integrated with (e.g., into) the condenser 80, or connected downstream of the condenser 80 along the core flowpath 50. However, various other types of separators are known in the art, and the present disclosure is not limited to any particular ones thereof. The water separator 94, for example, may alternatively be configured as or otherwise include an impingement surface, a centrifugal water separator and/or otherwise.

The water reservoir 96 is configured to store a quantity of water before, during and/or after recovery system operation. The water reservoir 96, for example, may be configured as or otherwise include a tank, a cylinder, a pressure vessel, a bladder or any other type of water storage container. An inlet to the water reservoir 96 is fluidly coupled with an outlet from the water separator 94 along the flow circuit 82 and its source circuit path 90.

The water flow regulator 98 is configured to direct and/or meter a quantity of the water stored within the water reservoir 96 to the liquid water circuit path 91 and/or the gaseous water (e.g., steam) circuit path 92. The water flow regulator 98 of FIG. 1, for example, is arranged at an intersection between an outlet from the source circuit path 90, an inlet to the liquid water circuit path 91 and an inlet to the gaseous water circuit path 92. The water reservoir 96 may thereby be fluidly coupled between the water flow regulator 98 and the water separator 94 along the flow circuit 82 and its source circuit path 90.

The evaporator 100 of FIG. 1 includes an internal combustion products passage 104 and an internal fluid (e.g., liquid water-to-gaseous water) passage 106, where each of these evaporator passages 104, 106 is fluidly discrete from one another. The combustion products passage 104 forms a portion of the core flowpath 50 which extends longitudinally through the evaporator 100. This portion of the core flowpath 50 is arranged between the PT rotor 36 and the core exhaust 56. The evaporator 100 of FIG. 1, for example, is arranged within the exhaust section 32. More particularly, the evaporator 100 of FIG. 1 is arranged along the core flowpath 50 between the PT section 31 and the condenser 80; however, the present disclosure is not limited to such an exemplary arrangement depending on recovery system heating and cooling requirements. The fluid passage 106 forms a portion of the flow circuit 82 and its gaseous water circuit path 92 which extends longitudinally through the evaporator 100. This portion of the flow circuit 82 of FIG. 1 and its gaseous water circuit path 92 is arranged downstream of the water flow regulator 98.

The evaporator 100 of FIG. 1 is schematically shown as a single pass, counterflow heat exchanger between the combustion products passage 104 and the fluid passage 106. The evaporator 100 of the present disclosure, however, is not limited to such an exemplary arrangement. The evaporator 100, for example, may alternatively be configured as a parallel flow heat exchanger or a crossflow heat exchanger between the combustion products passage 104 and the fluid passage 106. Moreover, any one or more of the evaporator passages 104, 106 may make two or more passes within the evaporator 100.

The liquid water circuit path 91 and the gaseous water circuit path 92 are fluidly coupled in parallel with and downstream of the source circuit path 90. The liquid water circuit path 91 of FIG. 1 extends longitudinally out from the intersection/the water flow regulator 98 to one or more liquid water circuit components 108 (one shown in FIG. 1 for ease of illustration) of the powerplant engine 14 and its engine core 26. One or more of these liquid water circuit components 108 may each be configured as or otherwise include a liquid water injector. Each liquid water injector may be configured to inject liquid water into the core flowpath 50. One or more of the liquid water circuit components 108 may also or alternatively be configured as an outlet for introducing the liquid water for cooling the core air along the compressor section 28; e.g., intercooling the core air upstream, along and/or downstream of the compressor rotor 34. The present disclosure, however, is not limited to the foregoing exemplary components which utilize the liquid water. In particular, various other uses for liquid water in a powerplant engine are known in the art, and the present disclosure is not limited to any particular one thereof.

The gaseous water circuit path 92 of FIG. 1 extends longitudinally out from the intersection/the water flow regulator 98 to one or more gaseous water circuit components 110 (one shown in FIG. 1 for ease of illustration) of the powerplant engine 14 and its engine core 26. One or more of these gaseous water circuit components 110 may each be configured as or otherwise include a steam injector. Each steam injector may be configured to inject gaseous water—steam—into the core flowpath 50; e.g., in the combustion chamber 64. One or more of the gaseous water circuit components 110 may also or alternatively be configured as an outlet for introducing the gaseous water for cooling structures and/or fluids along and/or within the combustor section 29 and/or the turbine section 30. The present disclosure, however, is not limited to the foregoing exemplary components which utilize the gaseous water—steam. In particular, various other uses for gaseous water in a powerplant engine are known in the art, and the present disclosure is not limited to any particular one thereof.

During operation of the recovery system 16, the bypass air may be directed into the condenser 80 and its bypass air passage 86. The fuel may be directed into the condenser 80 and its fuel passage 88. The combustion products, including the water vapor, are directed into the condenser 80 and its combustion products passage 84. The condenser 80 exchanges heat energy between the various working fluids—the bypass air, the fuel and the combustion products—flowing within the condenser 80. During normal powerplant operation, the combustion products flowing within the combustion products passage 84 are (e.g., significantly) warmer than the bypass air flowing within the bypass air passage 86 and the fuel flowing within the fuel passage 88. The condenser 80 is thereby operable to cool the combustion products using the bypass air and/or the fuel. This cooling of the combustion products may condense at least some of the water vapor (e.g., water in a gaseous phase, gaseous water) flowing within the combustion products passage 84 into liquid water droplets (e.g., water in a liquid phase). A quantity (e.g., at least some or all) of the liquid water may be collected and separated from the remaining gaseous combustion products within the core flowpath 50 by the water separator 94. The water separator 94 may subsequently direct the separated liquid water into the flow circuit 82 and its source circuit path 90 to the water reservoir 96 for (e.g., temporary) storage.

The water flow regulator 98 may selectively direct (e.g., pump, meter, guide, etc.) a quantity of the liquid water from the water reservoir 96 into the liquid water circuit path 91. The liquid water circuit path 91 may direct this quantity of the liquid water to the liquid water circuit components 108 for use with/within the engine core 26 and, for example, its compressor section 28.

The water flow regulator 98 may also or alternatively selectively direct a quantity of the liquid water from the water reservoir 96 into the gaseous water circuit path 92. The gaseous water circuit path 92 may direct this quantity of the liquid water into the fluid passage 106 of the evaporator 100. The combustion products are also directed into the evaporator 100 and its combustion products passage 104. The evaporator 100 exchanges heat energy between the various working fluids—the water and the combustion products—flowing within the evaporator 100. During normal powerplant operation, the combustion products flowing within the combustion products passage 104 are (e.g., significantly) warmer than the liquid water flowing into and within the fluid passage 106. The evaporator 100 is thereby operable to heat the water using the combustion products. This heating of the liquid water within the evaporator 100 and its fluid passage 106 may evaporate at least some or all of the liquid water flowing within the fluid passage 106 into gaseous water—steam. The gaseous water circuit path 92 may direct a quantity of this gaseous water from the evaporator 100 to the gaseous water circuit components 110 for use with/within the engine core 26 and, for example, its combustor section 29 and/or its turbine section 30.

Under certain conditions, the water recovered by the recovery system 16 (e.g., collected by the water separator 94 and directed into the flow circuit 82) may include one or more contaminants. These contaminants may include dust, dirt, sand or other debris ingested by the powerplant 10 through the airflow inlet 48. The contaminants may also or alternatively include other byproducts of the combustion of the fuel-air mixture such as soot and the like, particularly where the fuel is a hydrocarbon fuel. The present disclosure, of course, is not limited to the foregoing exemplary water contaminants.

If left alone, the foregoing contaminates may degrade, hinder and/or otherwise negatively influence operation of the recovery system 16 and/or the powerplant engine 14. For example, contaminants entrained and/or carried by the water flowing and/or otherwise contained within the recovery system 16 and its flow circuit 82 may form deposits onto one or more internal surfaces of the flow circuit 82 and its various members. Similarly, contaminants entrained and/or carried by the water directed into and/or otherwise contained within the powerplant engine 14 and its engine core 26 may form deposits onto one or more internal surfaces of the engine core 26 and/or the components. Such deposits may restrict fluid flow, alter heat transfer characteristics, alter thermal expansion characteristics, and the like. Mixing the contaminates with the core air may also alter combustion dynamics within the combustor section 29. The recovery system 16 of FIG. 1 therefore is provided with the treatment device 102 to reduce or eliminate affects associated with contamination in the recovered water.

The treatment device 102 is configured to treat the water flowing or otherwise contained within the recovery system 16 and its flow circuit 82. The term "treat" may describe a process whereby the contaminates within the recovered water are removed (e.g., filtered out) from the water, the contaminates within the recovered water are neutralized, a size of the contaminates within the recovered water are reduced, the contaminates within the recovered water are collected, and/or the like.

Referring to FIG. 3, the treatment device 102 may be configured as or otherwise include a water filter 112 (e.g., a porous membrane, a disposable filter element, etc.) for filtering liquid water and/or gaseous water—steam. The flow circuit 82 of FIG. 3 and its circuit path (e.g., 90, 92) are configured to direct the liquid and/or gaseous water through the water filter 112. As the water passes through the water filter 112, the water filter removes (e.g., filters out, strains out, etc.) some or all of the contamination particles from the water.

Referring to FIG. 4, the treatment device 102 may be configured as or otherwise include one or more anodes 114; e.g., galvanic anodes. These anodes 114 may be made from metals such as, but not limited to, aluminum (Al), magnesium (Mg), zinc (Zn) and/or alloys thereof. The anodes 114 may be disposed within the flow circuit 82 and its circuit path (e.g., 90, 92) and/or otherwise exposed to the liquid water and/or gaseous water to promote a redox reaction between the anodes 114 and one or more of the contaminates. The anodes 114 may thereby neutralize charged contamination particles as well as provide a sacrificial corrosion part for the recovery system 16. The anodes 114 may also or alternatively provide a receptor to which the contamination particles may bond and be collected.

Referring to FIG. 5, the treatment device 102 may be configured as or otherwise include an ultrasonic device 116. This ultrasonic device 116 may generate ultrasonic soundwaves and direct those ultrasonic sound waves into the liquid water and/or gaseous water. These ultrasonic soundwaves may collide with the contamination particles and break those particles into smaller particles which are less likely to form deposits and/or clog downstream recovery system hardware. It is also contemplated the ultrasonic soundwaves may be used to direct the contamination particles towards another treatment device such as a water filter or a catch to remove the contamination particles from the rest of the water.

Referring to FIG. 6, the treatment device 102 may be configured as or otherwise include a chemical injection device 118. This chemical injection device 118 is configured to direct a chemical into the liquid water and/or gaseous water. Examples of the chemical include, but are not limited to, a corrosion inhibitor and a detergent. The chemical may thereby be used to react with the contamination particles to reduce or prevent deterioration (e.g., corrosion) of the downstream recovery system hardware. Note, there may be no requirement for a mixture of the water and the chemical to be potable water.

Examples of various treatment devices are described above with respect to FIGS. 3-6. The present application, however, is not limited to such exemplary treatment device configurations. Moreover, while the various treatment devices are discretely described above, it is contemplated the treatment device 102 may include any two or more or all of the foregoing treatment devices. It is also contemplated the recovery system 16 may include multiple treatment devices along the flow circuit 82, where some or all of those treatment devices may have a common configuration or different configurations.

In some embodiments, referring to FIG. 1, the treatment device 102 may be disposed along the source circuit path 90 fluidly between the water separator 94 and the water reservoir 96. With such an arrangement, the treatment device 102 is configured to treat the liquid water recovered from the core flowpath 50 to reduce or prevent contamination of the downstream recovery system hardware before reaching the water reservoir 96.

Figure 7:
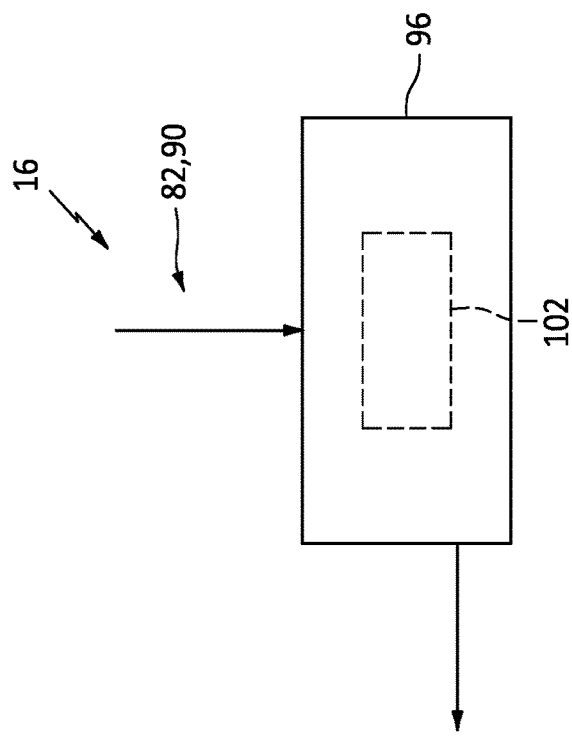
FIG. 7 is a schematic illustration of a portion of the recovery system with a treatment device disposed with a water reservoir.

In some embodiments, referring to FIG. 7, the treatment device 102 may be disposed with the water reservoir 96. The treatment device 102 of FIG. 7, for example, may be disposed within the water reservoir 96. With such an arrangement, the treatment device 102 is configured to treat the liquid water contained within the water reservoir 96 to reduce or prevent contamination of the downstream recovery system hardware. Of course, it is contemplated the treatment device 102 may also or alternatively be arranged at the inlet into the water reservoir 96 and/or the outlet from the water reservoir 96.

Figure 8:
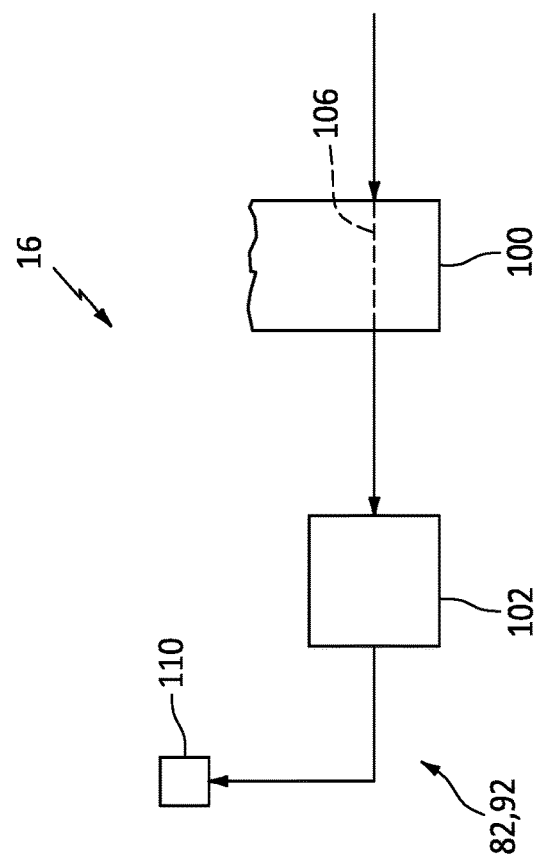
FIG. 8 is a schematic illustration of a portion of the recovery system with a treatment device disposed downstream of an evaporator.

In some embodiments, referring to FIG. 8, the treatment device 102 may be disposed along the gaseous water circuit path 92. The treatment device 102 of FIG. 8, for example, may be fluidly between the evaporator 100 and its fluid passage 106 and the gaseous water circuit components 110. With this arrangement, the treatment device 102 is configured to treat the gaseous water—steam—directed from the evaporator 100 to the gaseous water circuit components 110. This may reduce or prevent contamination of the gaseous water circuit components 110 as well as components which receive and/or interact with the gaseous water within the engine core 26.

The recovery system 16 may be included with various turbine engines other than the one described above. The recovery system 16, for example, may be included in a geared turbine engine where a geartrain connects one or more shafts to one or more rotors. Alternatively, the recovery system 16 may be included in a turbine engine configured without a geartrain. The recovery system 16 may be included in a geared or non-geared turbine engine configured with a single spool, with two spools, or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant for an aircraft, comprising:
a turbine engine core including a compressor section, a combustor section and a turbine section;
a recovery system including a condenser and a flow circuit, the flow circuit including a separator and a treatment device; and
a flowpath extending sequentially through the compressor section, the combustor section, the turbine section and the condenser from an inlet into the flowpath to an exhaust from the flowpath;
the recovery system configured to condense water flowing within the flowpath from a gaseous phase to a liquid phase using the condenser, the recovery system configured to direct the water in the liquid phase from the flowpath into the flow circuit using the separator, the recovery system configured to treat a quantity of the water within the flow circuit using the treatment device to provide treated water, and the recovery system configured to provide a quantity of the treated water to the turbine engine core wherein the treatment device is an anode and wherein the recovery system is configured to expose the quantity of the water within the flow circuit to the anode to promote a redox reaction between the anode and one or more contaminants within the quantity of the water to provide the treated water.

2. The powerplant of claim 1, wherein the quantity of the treated water provided to the turbine engine core is in the liquid phase.

3. The powerplant of claim 1, wherein
the flow circuit further includes an evaporator;
the recovery system is configured to evaporate the quantity of the treated water from the liquid phase to the gaseous phase; and
the quantity of the treated water provided to the turbine engine core is in the gaseous phase.

4. The powerplant of claim 3, wherein the recovery system is further configured to provide a second quantity of the treated water to the turbine engine core in the liquid phase.

5. The powerplant of claim 1, wherein
the flow circuit further includes a water reservoir; and
the treatment device is fluidly coupled with and between the separator and the water reservoir.

6. The powerplant of claim 1, wherein
the flow circuit further includes a water reservoir fluidly coupled with the separator; and
the treatment device is disposed within the water reservoir.

7. The powerplant of claim 1, wherein
the flow circuit further includes a water reservoir; and
the water reservoir is fluidly coupled with and between the separator and the treatment device.

8. The powerplant of claim 1, wherein
the flow circuit further includes an evaporator arranged fluidly between the turbine section and the exhaust, and the flowpath extends through the evaporator; and
the treatment device is fluidly coupled with and between the separator and the evaporator.

9. The powerplant of claim 1, wherein
the flow circuit further includes an evaporator arranged fluidly between the turbine section and the exhaust, and the flowpath extends through the evaporator; and
the evaporator is fluidly coupled with and between the separator and the treatment device.

10. The powerplant of claim 1, further comprising:
a mechanical load;
the turbine engine core configured to power the mechanical load.

11. The powerplant of claim 10, wherein
the mechanical load comprises a propulsor rotor; and
the turbine engine core further includes a power turbine section configured to drive rotation of the propulsor rotor.

12. A powerplant for an aircraft, comprising:
a propulsor rotor;

a turbine engine core configured to drive rotation of the propulsor rotor, the turbine engine core including a compressor section, a combustor section and a turbine section;

a recovery system including a condenser and a flow circuit, the flow circuit including a separator and a treatment device;

a core flowpath extending through the compressor section, the combustor section, the turbine section and the condenser from an inlet into the flowpath to an exhaust from the flowpath; and a bypass flowpath bypassing the turbine engine core and extending through the condenser;

the recovery system configured to condense water flowing within the flowpath from a gaseous phase to a liquid phase using the condenser, the recovery system configured to direct the water in the liquid phase from the flowpath into the flow circuit using the separator, and the recovery system configured to treat a quantity of the water within the flow circuit using the treatment device to provide treated water and the recovery system configured to provide a quantity of the treated water to the turbine engine core; wherein the treatment device is an anode and wherein the recovery system is configured to expose the quantity of the water within the flow circuit to the anode to promote a redox reaction between the anode and one or more contaminants within the quantity of the water to provide the treated water.

13. A powerplant for an aircraft, comprising:

a propulsor rotor;

a turbine engine core configured to drive rotation of the propulsor rotor, the turbine engine core including a compressor section, a combustor section and a turbine section;

a recovery system including a condenser and a flow circuit, the flow circuit including a separator and a treatment device;

a core flowpath extending through the compressor section, the combustor section, the turbine section and the condenser from an inlet into the flowpath to an exhaust from the flowpath; and a fuel system comprising a fuel circuit extending through the condenser, the fuel system configured to deliver fuel through the fuel circuit to the combustor section;

the recovery system configured to condense water flowing within the flowpath from a gaseous phase to a liquid phase using the condenser, the recovery system configured to direct the water in the liquid phase from the flowpath into the flow circuit using the separator, and the recovery system configured to treat a quantity of the water within the flow circuit using the treatment device to provide treated water and the recovery system configured to provide a quantity of the treated water to the turbine engine core; wherein the treatment device is an anode and wherein the recovery system is configured to expose the quantity of the water within the flow circuit to the anode to promote a redox reaction between the anode and one or more contaminants within the quantity of the water to provide the treated water.

* * * * *